United States Patent
Lloyd et al.

(10) Patent No.: US 9,342,486 B2
(45) Date of Patent: May 17, 2016

(54) FAST COMPUTATION OF GENERAL FOURIER TRANSFORMS ON GRAPHICS PROCESSING UNITS

(75) Inventors: David Brandon Lloyd, Redmond, WA (US); Charles Neil Boyd, Woodinville, WA (US); Naga K. Govindaraju, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1296 days.

(21) Appl. No.: 12/244,773

(22) Filed: Oct. 3, 2008

(65) Prior Publication Data

US 2010/0088356 A1 Apr. 8, 2010

(51) Int. Cl.
*G06F 17/14* (2006.01)

(52) U.S. Cl.
CPC ................... *G06F 17/142* (2013.01)

(58) Field of Classification Search
CPC .... G06F 17/141; G06F 17/142; G06F 17/144
USPC .................................................. 708/404, 405
See application file for complete search history.

(56) References Cited

U.S. PATENT DOCUMENTS

| | | |
|---|---|---|
| 6,411,978 B1 | 6/2002 | Naveh et al. |
| 2004/0167950 A1 | 8/2004 | Saha et al. |
| 2005/0146978 A1 | 7/2005 | Lee |
| 2006/0153467 A1 | 7/2006 | Staelin |
| 2007/0106718 A1 | 5/2007 | Shum et al. |
| 2007/0288542 A1 | 12/2007 | Shih |

OTHER PUBLICATIONS

Swarztrauber et al., "Bluestein's FFT for Arbitrary N on the Hypercube", 1991, pp. 1-18.*
Gough, "FFT Algorithms", 1997, pp. 1-37.*
Govindraju, et al., "Cache-Efficient Numerical Algorithms using Graphics Hardware", Parallel Computing archive vol. 33 , Issue 10-11, Nov. 2007, 16 pages.
Galoppo, et al., "Efficient Numerical Algorithms on Graphics Hardware", 2006, 2 pages.
"GPUFFTW: High Performance Power-of-Two FFT Library using Graphics Processors", 2003, 2 pages. http://gamma.cs.unc.edu/GPUFFTW/documentation.html.
Schiwietz, et al., "MR Image Reconstruction Using the GPU", Proceedings of SPIE, vol. 6142, 61423T, 2006, 12 pages.
Viola, et al., "GPU-based Frequency Domain Volume Rendering", Proc. of the 20th spring conf. on Computer graphics, 2004, 10 pages.
Doug Szperka, "Image Processing Toolkit for Handheld Devices with Programmable GPUs" retrieved: May 1, 2008, 23 pages.

(Continued)

*Primary Examiner* — Chuong D Ngo
(74) *Attorney, Agent, or Firm* — Sandy Swain; Sergey Lamansky; Micky Minhas

(57) ABSTRACT

Described is a technology for use with general discrete Fourier transforms (DFTs) performed on a graphics processing unit (GPU). The technology is implemented in a general library accessed through GPU-independent APIs. The library handles complex and real data of any size, including for non-power-of-two data sizes. In one implementation, the radix-2 Stockham formulation of the fast Fourier transform (FFT) is used to avoid computationally expensive bit reversals. For non-power of two data sizes, a Bluestein z-chirp algorithm may be used.

20 Claims, 6 Drawing Sheets

(56) References Cited

OTHER PUBLICATIONS

Fialka, et al., "FFT and Convolution Performance in Image Filtering on GPU", Proceedings of the Information Visualization (IV'06), 2006, 6 pages.
"CUFFT Library", CUDA, PG-00000-003_V1.0, Jun. 2007, 17 pages.
"Nvidia CUDA Compute Unified Device Architecture", Jun. 2008, 50 pages.
"Hardware Survey Results", Valve Corp., survey began Nov. 13, 2007, 11 pages. http://steampowered.com/status/survey.html.
Moreland, et al., "The FFT on a GPU", In SIGGRAPH/Eurographics Workshop on Graphics Hardware, 2003, 9 pages.
John Spitzer, "Implementing a GPU-Efficient FFT", SIGGRAPH GPGPU Course, 2003, 6 pages.
Mitchell, et al., "Advanced Image Processing with DirectX® 9 Pixel Shaders", in ShaderX2—Shader Tips and Tricks,Wolfgang Engel editor, Wordware, Sep. 2003, 30 pages.
Jansen, et al., "Fourier Volume Rendering on the GPU Using a Split-Stream-FFT", VMV 2004 Stanford, USA, Nov. 16-18, 2004, 8 pages.
Sumanaweera, et al., "Medical Image Reconstruction with the FFT", Chapter 48, Medical Image Reconstruction with the FFT, 2005, 765-768.
Govindraju, et al., "A Memory Model for Scientific Algorithms on Graphics Processors", SC2006 Nov. 2006, Tampa, Florida, USA, 10 pages.
Cooley, et al., "An algorithm for the Machine Calculation of Complex Fourier Series", Mathematics of Computation, vol. 19, No. 90, Apr. 1965, pp. 297-301.
David H. Bailey, "FFTs in External or Hierarchical Memory", The Journal of Supercomputing, vol. 4, 1990, 15 pages.

\* cited by examiner

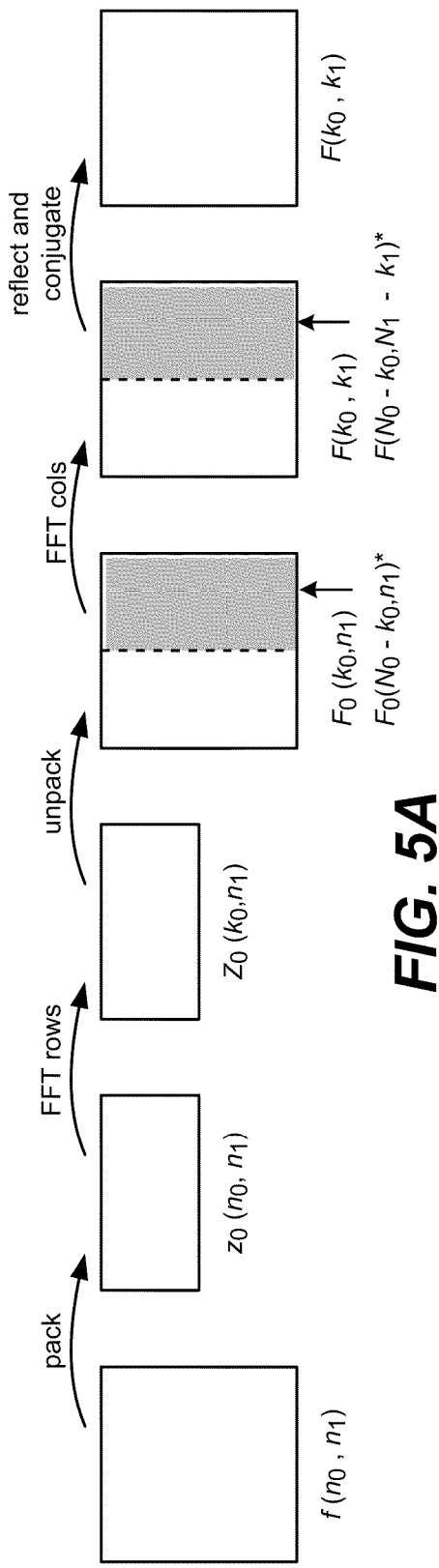
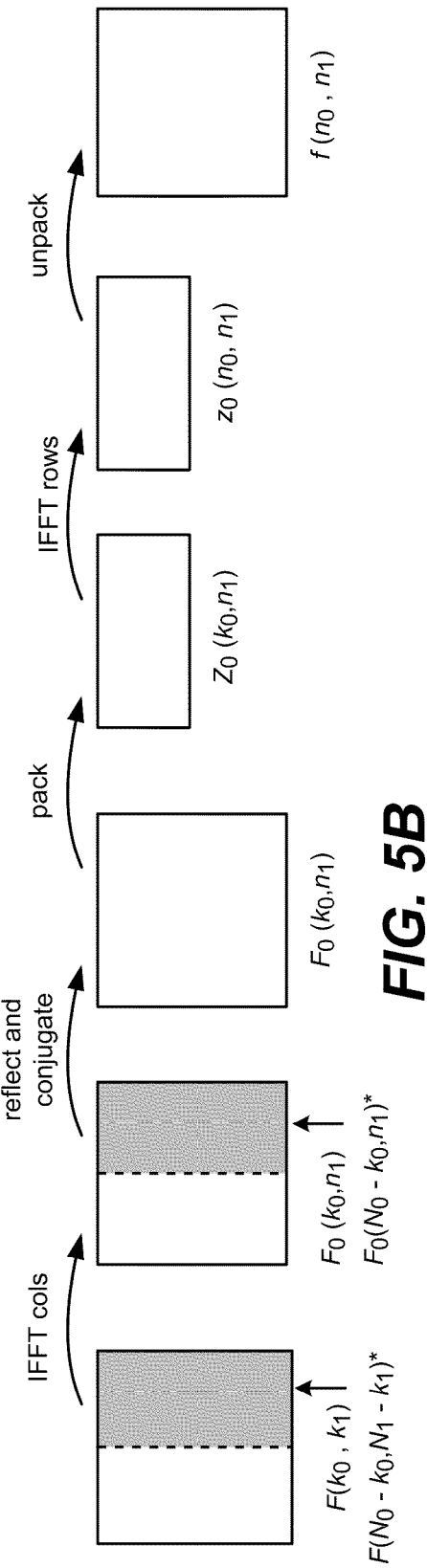
FIG. 5A
FIG. 5B

FAST COMPUTATION OF GENERAL FOURIER TRANSFORMS ON GRAPHICS PROCESSING UNITS

BACKGROUND

Commodity graphics processing units (GPUs) traditionally have been used for real-time, three-dimensional rendering in visualization applications and video games. Recently, however, the substantial computational power and relatively low cost of commodity graphics processors has made them increasingly attractive for more general purpose, data-parallel computations. The performance of GPUs comes from their large number of cores and high memory bandwidth, e.g., on the order of 128 scalar processors and 86 GB/s peak memory bandwidth.

As a result of these capabilities, GPUs are well-suited for a number of multimedia applications including signal processing for audio, images, and video. One component of such applications is the Fast Fourier Transform (FFT), comprising various, efficient algorithms to compute a discrete Fourier transform (DFT) and its inverse. However, while a number of FFT implementations for the GPU already exist, such implementations are limited to specific hardware, or are limited in functionality.

By way of example, one general FFT implementation for GPUs available today is the CUFFT library, which handles FFTs of varying sizes on both real and complex data. However, CUFFT is written in CUDA, a programming interface that is specific to only the most recent NVIDIA Corporation's GPUs, which are well known, but not necessarily that prevalent. To support multiple generations of GPUs from different vendors, some FFT libraries are written in the high-level shading languages found in standard graphics APIs such as OpenGL or DirectX®. However, these implementations share one significant limitation, namely that they are restricted to processing sizes that are a power of two.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a general Fourier transform library performs fast Fourier transforms via a programmable GPU on one-dimensional and two-dimensional data of arbitrary size. The library may be accessed by a standard (GPU hardware-independent) graphics API, e.g., DirectX®.

In one aspect, the library evaluates the received input data to determine how to run the fast Fourier transforms on the graphics processing unit. For example, if the user specifies that the data is a real sequence, the library packs elements of the data into a complex sequence of about half the size. For data sizes that are not a power of two, the library performs the fast Fourier transform via a linear convolution.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIGS. 5A and 5B are representations of packing of real data for two-dimensional FFTs having odd lengths in both dimensions.

DETAILED DESCRIPTION

Various aspects of the technology described herein are generally directed towards using a programmable graphics processing unit (GPU) for high performance computation of general Discrete Fourier Transforms (DFTs) based on Fast Fourier Transforms (FFTs). While some of the examples described herein are directed towards a standard library, e.g., based on DirectX® APIs, it is understood that these are only examples. Indeed, other graphics processing APIs may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and graphics processor computations in general.

Figure 1:
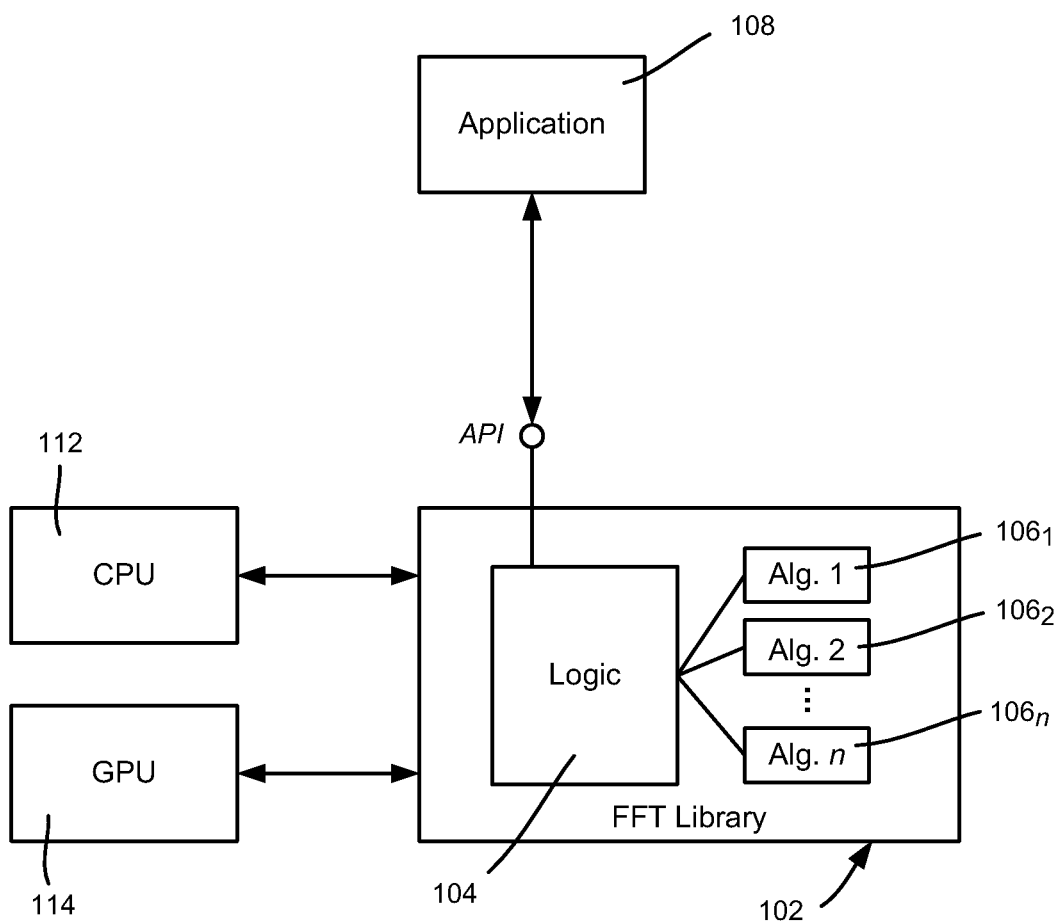
FIG. 1 is a block diagram showing an example implementation of a fast Fourier transform (FFT) library configured to perform GPU-based computations in a computing environment.

Turning to FIG. 1, in one example, an FFT library 102 is provided, and as will be understood, is general in terms of the programmable GPUs it supports, and general in its functionality. In other words, the GPU is a programmable GPU (e.g., a contemporary GPU that supports DirectX® 9 or later) that is independent of any particular graphics hardware architecture. One example FFT library 102 described herein is written based upon standard APIs such as DirectX®, yet handles one-dimensional and two-dimensional FFTs for power-of-two and non-power-of-two sizes on both real and complex data, using API logic 104 that chooses an appropriate algorithm $106_1$-$106_n$ based upon input from an application program 108 or the like. The library 102 then works with the CPU 112 and GPU 114 to perform the computations, similar to other graphics processing mechanisms.

However, unlike known FFT libraries, the library described herein is general in the sense that it works on a wide range of GPUs and/or in that it supports inputs of both real and complex data of any size. Note that FFT libraries may perform the same computations on a CPU. While a general library typically is directed more towards providing functionality over a wide range of GPUs than towards attaining maximum performance for any specific GPU, even a general implementation (at least on newer) GPUs typically outperforms the same computations on a CPU, while achieving comparable performance to vendor-specific implementations (such as CUFFT).

By way of background, in a standard GPU programming model, standard graphics APIs use a programming model that is essentially stream processing. Kernels are run independently on the data elements of input streams to produce an output stream. Two main types of kernels are used on the GPU, namely vertex programs and fragment programs. Vertex programs transform an input stream of vertex records comprising vertex positions and other vertex attributes (such as color). The vertices of the transformed output stream are grouped together to form geometric primitives (e.g. every four vertices form a quadrilateral). The primitive is rendered to a two-dimensional buffer, that is, the framebuffer or a texture map. A fragment is generated for each buffer element covered by the primitive. A fragment program is run on the fragment stream; to generate an output value for each fragment, the fragment program uses data from a buffer of constants, then bilinearly interpolated vertex attribute values, and texture maps with random read access. The interpolated attribute values are commonly used to compute an address from which to read the texture. The output value is then stored at a fragment's position in the buffer.

An N point Discrete Fourier Transform (DFT), $\mathcal{F}_N$, of a sequence f(n), is computed using the following equation:

$$F(k) = \mathcal{F}_N\{k, f\} = \sum_{n=0}^{N-1} f(n) e^{-2\pi i k n / N}, \quad (1)$$

where n∈[0, N−1] and k∈[0, N−1]. The sequence f(n) is referred to as the time domain and F(k) as the frequency domain. The Fast Fourier Transform (FFT) is a family of algorithms for efficiently computing the DFT.

The "Decimation in Time" (DIT) algorithm recursively splits the time domain into a DFT of even and odd elements:

$$\mathcal{F}_N\{k, f\} = \mathcal{F}_{N/2}\{k', f_e\} + T_N(k)\mathcal{F}_{N/2}\{k', f_o\}$$

$$k' = k \bmod N/2$$

$$f_e(n) = f(2n)$$

$$f_o(n) = f(2n+1)$$

$$T_N(k) = e^{-2\pi i k / N}.$$

The $T_N$ values are referred to as twiddle factors; this FFT algorithm is often called the Cooley-Tukey algorithm.

The "Decimation in Frequency" (DIF) algorithm is similar to DIT, except that it recursively splits the frequency domain into DFTs for even and odd k:

$$\mathcal{F}_N\{k, f\} = \begin{cases} \mathcal{F}_{N/2}\{k/2, f_e\} & \text{for } k \text{ even} \\ \mathcal{F}_{N/2}\{(k+1)/2, f_o\} & \text{for } k \text{ odd} \end{cases}$$

$$f_e(n') = f(n') + f(n' + N/2)$$

$$f_o(n') = T_N(n')(f(n') - f(n' + N/2))$$

$$T_N(n') = e^{-2\pi i n' / N}$$

where n'∈[0, N/2−1]

Both of these algorithms require that N be a power of two. The algorithms may be performed in-place by concatenating the subtransforms in a single array. However, this requires a reordering of the elements. For the DIT, the input needs to be in bit-reversed order, that is, the value corresponding to index n is actually found at the index formed by reversing the bits of n. The DIF starts with the input in natural order, but produces bit-reversed output. The inverse DFT can be computed by conjugating the twiddle factors and dividing the final values by N.

Figure 2:
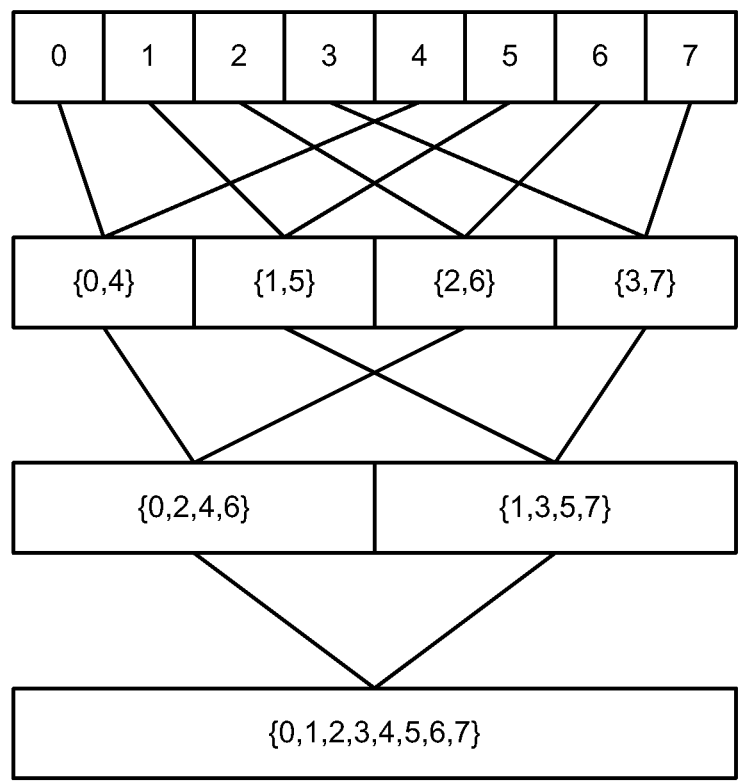
FIG. 2 is a representation of dataflow for a radix-2 Stockham algorithm.

The dataflow for the Cooley-Tukey algorithm can be expensive because of the initial bit-reversal permutation, due to the memory accesses being incoherent. Thus, for one implementation of the FFT library 102, the known radix-2 Stockham FFT algorithm is used, which reorders the dataflow in order to eliminate the need for the bit-reversal, as generally represented in FIG. 2. This algorithm does not perform the FFT in-place. Because textures cannot have simultaneous read and write access, the FFT needs to be performed out-of-place in any event.

One implementation of the Stockham FFT uses 32-bit floating point textures with two channels to store the real and imaginary components of complex data. The described implementation stores a one-dimensional array in each row of the texture and performs multiple one-dimensional FFTs of the same length simultaneously. A single quadrilateral is rendered into an output texture that is the same size as the input texture, using the fragment program exemplified in the following pseudo-code, where x and y are the positions of the fragment in the buffer, N is the size of the entire FFT, and Ns is the size of the subtransform for the current iteration; "input" is an input texture:

```
FFT_Rows (x, y, N, Ns, input)
{
    base = floor(x / Ns) * (Ns / 2);
    offset = x mod (Ns/2);
    x0 = base + offset;
    x1 = x0 + N/2;
    (Re0, Im0) – input[x0][y];
    (Re1, Im1) – input[x1][y];
    angle = –2*PI* (x/Ns);
    (ReT, ImT) = (cos(angle), sin(angle) );
    return (Re0 + ReT * Re1 – ImT * Im1,
           Im0 +ImT * Re1 + ImT * Im1 );
}
```

The process then swaps the input and output textures and repeats for log 2(N) iterations.

The two-dimensional FFT can be computed by computing one-dimensional FFTs along the rows followed by one-dimensional FFTs along the columns. Because traversing columns of a row-major two-dimensional array stored linearly in memory has low spatial locality, the FFT along columns is usually implemented (on a CPU) by transposing the array, performing the transform on the rows, and transposing back. On a GPU, however, textures are swizzled in memory so as to preserve two-dimensional locality. Thus, no such transposes are necessary.

In one aspect, algorithms are known for handling DFTs of lengths that are not a power of two. Mixed radix algorithms recursively split a DFT of length $N=N_x N_y$ into smaller DFTs of lengths $N_x$ and $N_y$. This generally works best for lengths that are highly composite numbers. Other algorithms exist for lengths that are prime numbers.

Rather than implement a large number of special cases, what is commonly called the Bluestein z-chirp FFT algorithm is used herein for non-power-of-two sizes. The algorithm substitutes $kn=(k^2+n^2-(k-n)^2)/2$ into the complex exponential of Equation 1 and rearranges the terms to get:

$$F(k) = \left[e^{-\pi i k^2/N}\right] \sum_{n=0}^{N-1} \left[f(n)e^{-\pi i n^2/N}\right]\left[e^{+\pi i(k-n)^2/N}\right]$$

$$= b^*(k)\sum_{n=0}^{N-1} a(n)b(k-n)$$

$$a(n) = f(n)b^*(n)$$

$$b(n) = e^{-\pi i n^2/N},$$

where a and b correspond to sequences of length N (n=0, . . . , N−1), and where b* is the conjugate of b. The summation is a linear convolution c=a*b. When a and b are large, the convolution can be performed more efficiently as a dot product in the frequency domain due to the following property:

$$F\{a*b\} = F\{a\} \cdot F\{b\}.$$

Before performing the FFT, a and b are zero padded to a size N' that is at least the size of the convolved signal in order to avoid aliasing. The lengths of a and b are N and 2N−1, respectively, so the length of a*b is N+(2N−1)−1=3N−2. However, only values for k∈[0;N−1] are of interest; aliasing beyond this range does not affect the solution, which means that it is sufficient that N'≥2N−1.

The range of valid indices for the b value is [−(N−1);N−1]. After zero padding, the indices lie in [−(N−1);N'−(N−1)]. Negative indices are inconvenient, so relying on the fact that the FFT treats the input signal as if it were periodic, the values in the negative range are moved to the other end of the array so that the indices run from 0 to N'−1. The convolution is then computed as follows:

$$c(k') = F_{N'}^{-1}\{k', F_{N'}\{k',a\} \cdot F_{N'}\{k',b\}\},$$

where k'∈[0;N'−1]. An advantage of this algorithm is that N' can be chosen to be a power of two, which is already known how to be efficiently handled.

For one implementation of the algorithm, N' is chosen to be the next power of two greater than or equal to 2N−1. Processing computes the b vector and its Fourier transform B(k')= $F_{N'}\{k',b\}$ on the CPU and stores them in a texture. These can be reused for multiple transforms of the same size. Processing then renders to a texture of width N' and compute a(n') from the input textures containing b and f, and zero pad elements n'>N−1. Also computed is A(k')=$F_{N'}\{k', a\}$ using the power-of-two FFT routine described above. (B(k') may also be computed on the GPU the same way.

Another pass performs the dot product A(k') B(k'). The inverse FFT of the result is computed to get c(k'). A final pass computes b*(k)·c(k). To compute two-dimensional FFTs, this algorithm is performed on both rows and columns. Because this algorithm requires both a forward and inverse FFT of size N', which is about 2N in the best case and nearly 4N in the worst case, the algorithm is roughly four to eight times slower than is the Stockham algorithm on similar power-of-two sizes. Note that a reason to compute b on the CPU is that for large values of n, the $n^2$ term in b(n) cannot be computed directly with enough precision (e.g., with double precision) with the single precision available on most GPUs, however this may be alternatively done on GPUs that support double precision.

The total number of elements in an FFT in one current implementation is limited to the number of elements in the largest allocatable texture on the GPU. However, the number of rows or columns in a batch of one-dimensional FFTs or a two-dimensional FFT can exceed the maximum texture dimensions, yet still have fewer than the maximum number of elements (e.g., a single large one-dimensional FFT). This situation is handled by concatenating the rows and wrapping them in the rows of the texture.

The FFTs on this "wrapped" representation may be computed in two ways. One way introduces a level of indirection in the indexing, computing a logical index for each fragment from its physical address in the texture. By way of example, suppose that (x, y) represents the physical address of the current fragment in the destination texture of width W. The logical address ($x_l$, $y_l$) in an $N_x \times N_y$ array is computed as:

$$u = y \cdot W + x$$

$$x_l = u \bmod N_x$$

$$y_l = \lfloor u/N_x \rfloor.$$

The logical index can be used in the same fragment programs as described above. When reading from the input texture, the logical input index is converted back to a physical address:

$$u = y_l \cdot N_x + x_l$$

$$x = u \bmod W$$

$$y = \lfloor u/W \rfloor.$$

An advantage of this method is its flexibility. However, it requires extra computation and can destroy two-dimensional locality in its access patterns for some combinations of $N_x$ and W.

A second approach is to compute a single, large one-dimensional FFT by computing FFTs along the rows and columns of its wrapped representation using what is sometimes referred to as the "four-step" framework.

Figure 3:
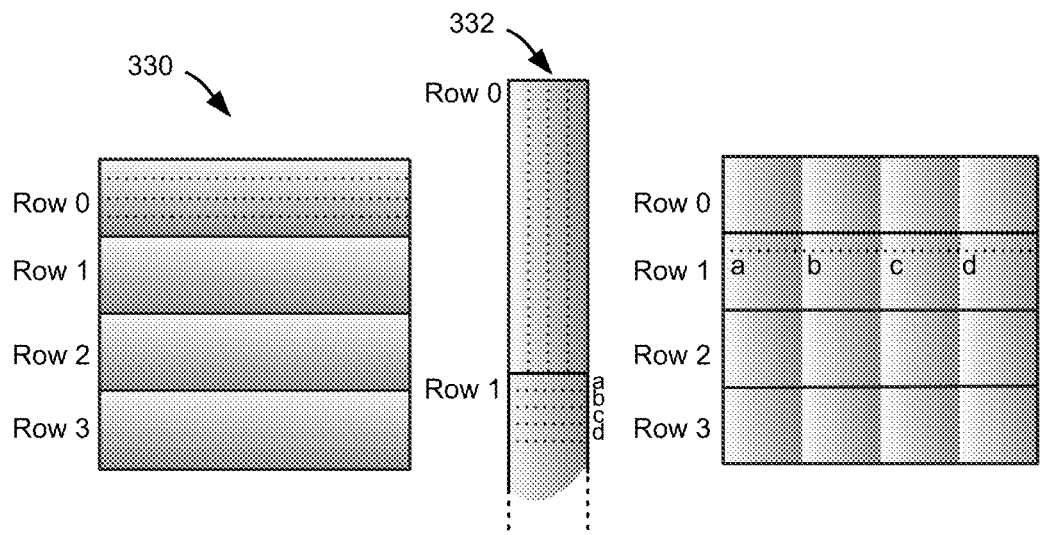
FIG. 3 is a representation of transposes that may be performed for processing large FFTs on a GPU.

As generally represented in FIG. 3, which shows local transposes in the four-step method for large FFTs, four long rows 330 are wrapped at the maximum texture width into multiple rows to form a sub-block 332 of the texture. The four-step method transposes each of these sub-blocks independently, and thus exceeds the maximum texture dimensions. The results are re-wrapped back into the texture.

More particularly, FFTs are computed along the columns, then each element is multiplied by a twiddle factor:

$$T(x,y) = e^{-2\pi i x y/N}$$

where (x, y)∈[0,W−1]×[0,H−1] are the physical coordinates of the element, and H=N/W. The FFT is computed along the rows and the result transposed. An advantage of this method is that it preserves two-dimensional locality. In one implementation, this method is used only for large power-of-two FFTs; for large non-power-of-two DFTs computed with the z-chirp algorithm, logical indexing is used for the steps, except for the two FFTs used to compute the convolution, for which the above four-step method is utilized.

With batches of large one-dimensional FFTs, a single row is wrapped into a sub-block of the texture. The transpose step of the four-step method is computed for each sub-block independently. Such transposes are referred to herein as local transposes.

Figure 4:
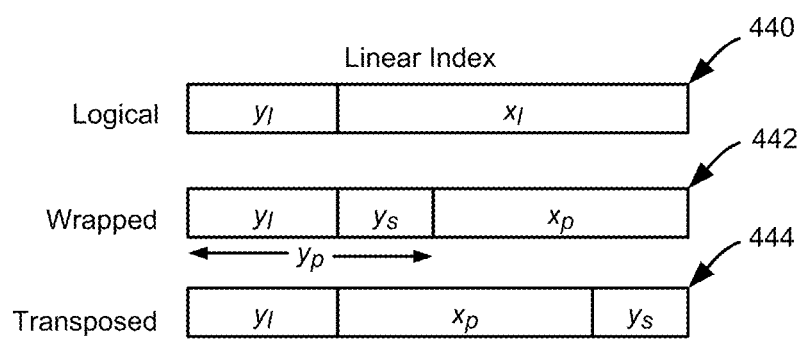
FIG. 4 is a representation of computing indices for local transposes corresponding to the transposes FIG. 3.

As shown in FIG. 4, physically transposing the sub-blocks can cause the texture dimensions to be exceeded. Instead, the logical equivalent of performing a local transpose and rewrapping to the maximum texture width is computed.

FIGS. 5A and 5B represent how computing indices for the local transposes in the four-step FFT may be accomplished. The linear index of an element in a batch of large one-dimensional FFTs is composed by concatenating the bits of the logical address ($x_l$, $y_l$) 444, where the length of the FFTs is a power of two. The address in the physical index in the wrapped representation $(x_p, y_p)$ 442 is computed by reinterpreting the appropriate bits of the linear index; $y_s$ is the y coordinate within a sub-block corresponding to one logical row. A local transpose 444 exchanges $y_s$ and $x_p$. The final physical coordinates are computed by reinterpreting this last linear index. The process is analogous for non-power-of-two sizes. Note that the DX9 API does not support scatters, so on implementation of the process gathers to the physical destination by inverting this process to compute the corresponding logical index.

Note that one implementation does not directly support large two-dimensional FFTs that can not fit within a single texture. However, the library can be used to handle large two-dimensional FFTs by performing the FFTs on several rows at a time, as many as can fit into one texture. After the rows have been transformed, the same thing is done for the columns. Large FFTs along columns are supported by first performing a global transpose on the wrapped representation, then proceeding as with batches of large row FFTs, and performing a global transpose at the end.

Many applications require the Fourier Transform of real-valued sequences. The DFT of real-valued sequence has a symmetry that can be used to compute the FFT more efficiently:

$$F(k)=F(N-k)^* \quad (2)$$

F is periodic so $F(N)=F(0)$. Two real-valued sequences x and y are packed into single a complex sequence z, thus reducing the size of the transform by a factor of two:

$$z(n)=x(n)+iy(n):$$

The process can be inverted:

$$x(n)=(z(n)+z^*(n))/2$$

$$y(n)=-i(z(n)-z^*(n))/2$$

Because the DFT is a linear operator, $F\{x\}$ and $F\{y\}$ can be recovered from $F\{z\}$:

$$X(k)=(Z(k)+Z^*(k))/2$$

$$Y(k)=-i(Z(k)-Z^*(k))/2$$

$Z^*(k)$ can be computed using another symmetry relation:

$$Z^*(k)=Z(N-k)^*.$$

For a one-dimensional FFT with N even, even and odd elements are packed together, $x=f_e$ and $y=f_o$. After performing the FFT on the packed data, $X=F_e$ and $Y=F_o$ are then unpacked and the final iteration of the FFT is performed in the same pass. If N is odd, this packing scheme cannot be used. For batches of odd length FFTs, however, adjacent rows can be packed together. If there are an odd number of FFTs in the batch, an extra row of zeros can be added.

For two-dimensional FFTs, the symmetry relationships are similar to those used in one-dimensional computing:

$$F(k_0,k_1)=F(N_0-k_0,N_1-k_1)^*$$

$$Z^*(k_0,k_1)=Z(N_0-k_0,N_1-k_1)^*. \quad (3)$$

If the length is even along one of the dimensions d, even and odd elements along d, $f_e$ and $f_o$, are packed together, the two-dimensional FFT is performed, $F_e$ and $F_o$ are unpacked, and the last FFT iteration along d is computed. When the lengths are odd in both dimensions, each dimension is treated as a batch of real one-dimensional FFTs. This requires an unpack after transforming the rows, followed by another pack before transforming the columns.

It is possible, however, to eliminate one of these extra intermediate passes as illustrated in FIGS. 5A and 5B. More particularly, FIG. 5A shows packing real data for two-dimensional FFTs with odd lengths in both dimensions. In the forward transform, consecutive rows are packed together to form z. After performing the FFT along the rows of z, only half of the data is unpacked. The FFT is performed on the columns of this half.

As shown in FIG. 5B, the other half is then obtained by reflecting and conjugating the result. For the inverse transform, the inverse FFT is first performed on half of the columns; (the rest of the steps are similar to the forward transform).

Another way to implement FFTs of real-valued data is to do the computation on only the first half of each sub-transform in the algorithm. This approach can save the packing step. However, it cannot be used with the z-chirp algorithm used for evaluating non-power-of-two length FFTs.

Note that numerical precision issues may be addressed. For example, DirectX® does not currently support integer data types so indices are computed with floating point, which can lead to precision errors. Precision errors may occur because the coordinate interpolation may not be exact; on some GPUs, the interpolated integer coordinates have a fractional component. For GPUs that support Shader Model 3.0, the VPOS semantic returns the integer pixel location of a fragment, thereby eliminating interpolation errors. Interpolating linear addresses may save some instructions in the fragment program, but some GPUs do not interpolate with enough precision for this to work properly on large data.

Further, imprecision can result from mod operations. This is due to the way that mod is implemented, namely based on the frac( ) instruction, which returns the fractional part of a floating point number:

float mod(x,y){return frac(x/y)*y;}

This code assumes that x and y are non-negative. Even when they are exact integers, this code can produce non-integer results when y is not a power of two. The result of the division, implemented as x multiplied by the reciprocal of y, cannot always be represented exactly in floating point, leading to a loss of precision.

It is possible to remove imprecision by using floor operations together with a small offset following any every operation that can potentially introduce imprecision. However, floor operations are relatively expensive, and thus floors are used sparingly. The offsets are necessary to prevent a number from falling onto the wrong side of an integer boundary. Offsets and nearest neighbor sampling also may be used when fetching a value from a texture to avoid errors introduced by bilinear filtering.

Floating point precision also limits the size of the Fourier transforms that are supported. The logical indexing used when the data exceeds the texture size limits requires the computation of linear addresses. The maximum size of the linear address is limited to the precision of a floating point number, which for some GPUs is less than the maximum number of elements in a texture.

The API for the library is straightforward, comprising two main functions. A first function is a configuration function that tells the library what format to expect for the data:

```
Configure ( bool Real,
            int DataSize[2],
            int RectSize[2],
            int DimMask )
```

"Real" indicates whether data in the spatial domain is real-valued or not. "DataSize" is the dimensions of the actual data. For one-dimensional FFTs, one of the dimensions indicates the number of batches and the other indicates the length. "RectSize" is the size of the rectangle in the texture in which the data is laid out. If DataSize[0] is not the same as RectSize[0], then the data is assumed to be wrapped. DimMask is a bit mask with a bit set for each dimension to which the FFT is to be applied. Thus for a two-dimensional transform, the bits for both dimensions are set. Once the library is configured, the user passes input and output textures to the Compute( ) function:

```
Compute ( bool Inverse,
         IDirect3DTexture9* pInputTexture,
         IDirect3DTexture9* pOutputTexture )
```

The direction of the transform is determined by the Inverse flag. Helper functions are provided for loading textures with values from arrays on the CPU. An intended usage model for the API is that after calling Configure( ), a user calls Compute( ) for both the forward in inverse directions multiple times for FFTs of the same size and type.

The library allocates two additional temporary buffers for computing intermediate results; a more advanced API allows the user to provide the temporary buffers. This is useful when computing large FFTs because the input and output can be used as the temporary buffers in order to conserve memory. The advanced API also provides other conveniences such as specifying which channel to read from or write to for real data, and specifying an origin for the texture sub-rectangle that contains the data.

The FFT library makes it straightforward to use a wide variety of GPUs for FFTs of various sizes and types, while still delivering good performance.

Figure 6:
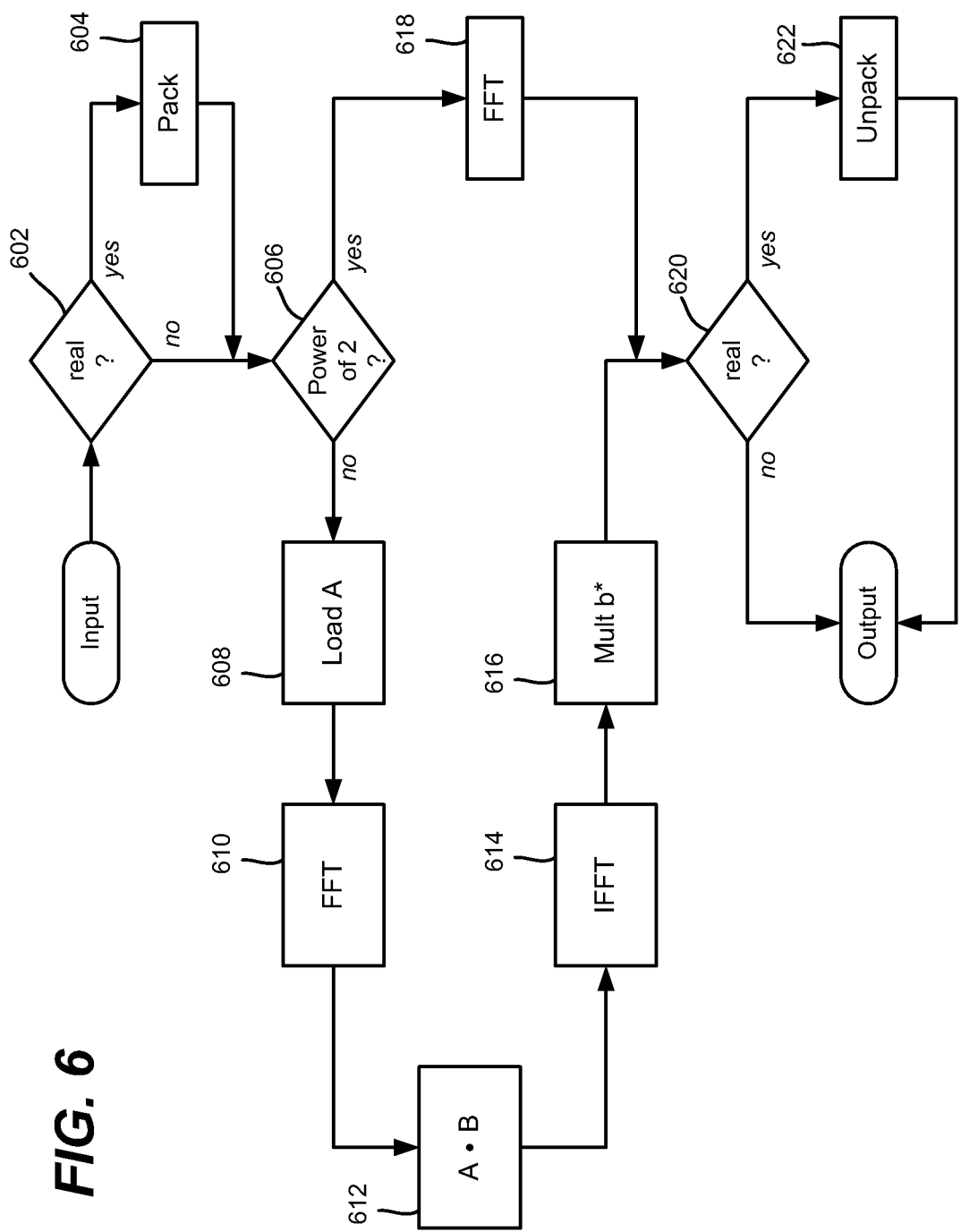
FIG. 6 is a flow diagram representing example steps for evaluating input data to determine how to perform fast Fourier transforms on a GPU to provide an output result.

FIG. 6 summarizes example steps for a one-dimensional FFT computation, which as described above may be extended for two-dimensions. Upon receiving input, step 602 evaluates whether the data is real. If so, the data is packed at step 604, as described above.

If the size of the FFT is a power of two, the FFT is performed at step 616, and the results returned as output, unpacking real data at step 622 if needed (as determined via step 620). If the size is a non-power of two, the convolution is performed as described above.

More particularly, for a non-power of two the DFT is performed with a convolution. The convolution is performed in frequency space by first computing the FFT of a and b (step 610), taking their dot product (step 612), and computing the inverse FFT on the result (step 616). Note that the convolution may be performed directly via summation. This may be faster when A and B are small. The result of the convolution is multiplied by the conjugate of b, (b*), as generally represented via step 616. The result is returned as the output, unpacking real data at step 622 if needed (as determined via step 620).

Exemplary Operating Environment

Figure 7:
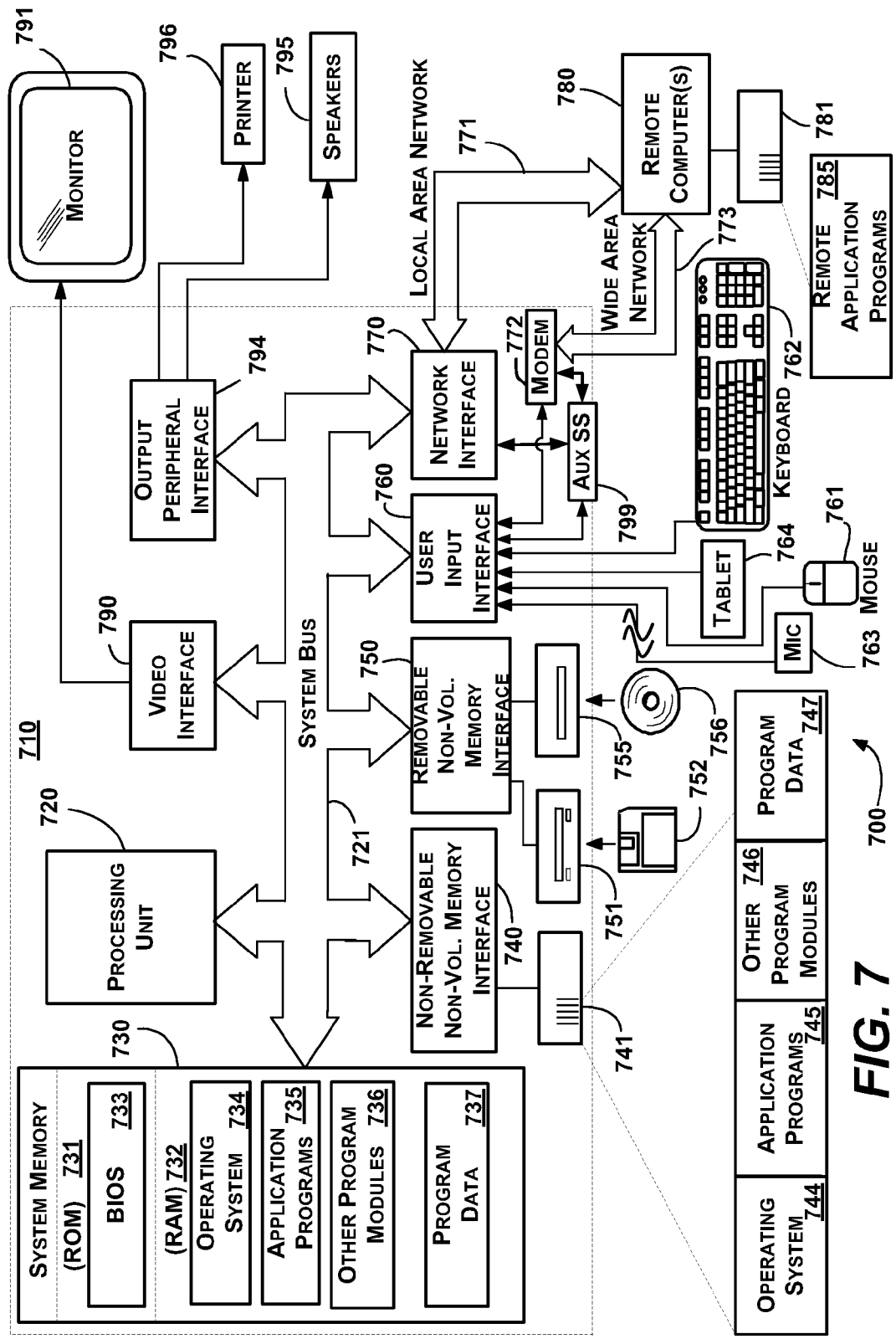
FIG. 7 shows an illustrative example of a computing environment into which various aspects of the present invention may be incorporated.

FIG. 7 illustrates an example of a suitable computing and networking environment 700 on which the examples of FIGS. 1-4 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component 774 such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment that includes a programmable graphics processing unit, a method comprising:
  receiving arbitrary-sized data including data comprising a sequence of numbers having a length that is a non-power of two and another sequence of numbers;
  evaluating how to compute discrete Fourier transforms on the graphics processing unit based upon a format of the data;
  determining whether the data is real-valued; and
  if the data is real-valued, packing elements of the sequence into a complex sequence, running at least some of the discrete Fourier transforms in parallel, and returning the computed discrete Fourier transforms, wherein when the sequence is one-dimensional and further comprising when a one-dimensional length is even, packing together even and odd elements of the sequence into packed data that comprises components of the complex sequence, performing the fast Fourier transforms on the packed data, and unpacking the packed data, or when the one-dimensional length is odd, packing together elements of the sequence and elements of the other sequence into a packed sequence that comprises components of the complex sequence, including if the data comprises an odd number of sequences, adding an extra sequence of zeros to make an even number of sequences, and performing the fast Fourier transforms on the packed sequence.

2. The method of claim 1 wherein running at least some of the discrete Fourier transforms in parallel further comprises using a fast Fourier transform based on a radix-2 Stockham formulation.

3. The method of claim 1 wherein evaluating how to compute the discrete Fourier transforms comprises determining whether to perform a fast Fourier transform on a first set of elements in each sub-transform to save the packing step.

4. The method of claim 1 further comprising, performing a convolution to compute the discrete Fourier transform.

5. The method of claim 4 wherein performing the convolution comprises performing a fast Fourier transform on two sets of data elements that comprise the data, performing a dot product on the two sets of data elements, and performing an inverse fast Fourier transform on a result of the dot product.

6. The method of claim 5 further comprising, padding a first set of data elements and a second set of data elements each to a size corresponding to a power of two.

7. The method of claim 6 further comprising, moving data corresponding to negative indices to a position in an array in which the indices are non-negative.

8. The method of claim 1 wherein the data is two-dimensional, and further comprising, when a length along at least one of the dimensions is even, packing together even and odd elements, performing two-dimensional fast Fourier transforms on the packed data, and unpacking the packed data.

9. The method of claim 1 wherein the data is two-dimensional, and further comprising, when the length along both dimensions is odd, packing consecutive pairs of sequences of the data in one dimension, performing the fast Fourier transforms along the packed consecutive sequences of the data, unpacking the packed consecutive sequences into a partially unpacked set, performing the fast Fourier transforms on columns of this set into a partial result, and reflecting and conjugating the partial result.

10. The method of claim 1 wherein the data is two-dimensional real data, and further comprising, packing the real data into a smaller set of complex data.

11. The method of claim 1 wherein the data corresponds to large Fourier transforms, and further comprising, concatenating sequences of the data and wrapping the concatenated sequences into a texture as a wrapped representation, and computing Fourier transforms on the wrapped representation by computing logical indexes based on physical addresses in the texture.

12. One or more computer-readable storage media having computer-executable instructions, which when executed perform steps, comprising:

receiving input data at a discrete Fourier transform library;
processing the input data via a programmable graphics processing unit (GPU), including determining that the input data comprises sequences of which a numerical sequence corresponds to a length that is a non-power of two; and determining whether the input data is real-valued, and if so, packing elements of the numerical sequence into a complex sequence and running a discrete fast Fourier transform, wherein when the numerical sequence is one-dimensional and further comprising when a one-dimensional length is even, packing together even and odd elements of the numerical sequence into packed data that comprises components of the complex sequence, computing fast Fourier transforms on the packed data via the GPU, and unpacking the packed data, or when the one-dimensional length is odd, packing together elements of the numerical sequence and elements of another sequence of the sequences into a packed sequence that comprises components of the complex sequence, including if the input data comprises an odd number of the sequences adding an extra sequence of zeros to make an even number of sequences, and computing the fast Fourier transforms on the packed sequence via the GPU.

13. The one or more computer-readable storage media of claim 12 wherein processing the input data further comprises performing a convolution via the GPU, including performing a fast Fourier transform on two numerical sequences computed from the complex sequence to produce transformed data, computing a dot product of the transformed data, and performing an inverse fast Fourier transform on the result of the dot product computation; and multiplying a result of the inverse fast Fourier transform with a conjugate of a second numerical sequence of the two numerical sequences, and outputting a result corresponding to the conjugate.

14. The one or more computer-readable storage media of claim 12 wherein packing elements of the numerical sequence into a complex sequence further comprises concatenating the sequences of the input data, wrapping the concatenated sequences into a texture as a wrapped representation when at least one of the sequences exceeds a maximum texture dimension, and computing the fast Fourier transforms on the wrapped representation by computing logical indexes based on physical addresses in the texture.

15. In a computing environment, a system comprising, a programmable graphics processing unit and logic for a general discrete Fourier transform library that is coupled to the programmable graphics processing unit, wherein the logic is further configured to process input data, choose one or more appropriate Fast Fourier algorithms based upon a format of the input data, and when the input data comprises a sequence of numbers that is one-dimensional and real-valued and a length of the sequence is even, the input data further comprising another sequence of numbers, the logic is further configured to pack together even and odd elements into packed data comprising components of at least one complex sequence, perform Fast Fourier transforms on the packed data in parallel on the programmable graphics processing unit, and unpack half of the packed data, or when the length is odd, the logic is further configured to pack together the sequence and the other sequence into a packed sequence comprising components of the at least one complex sequence, including if a number of sequences is odd, add an extra sequence of zeros to make an even number of sequences, and perform the Fast Fourier transforms on the packed sequence in parallel on the programmable graphics processing unit.

16. The system of claim 15, wherein the logic is further configured to perform one or more iterations of the one or more appropriate Fast Fourier transform on the output data.

17. The system of claim 15, wherein the logic is further configured to remove numerical imprecision corresponding to the input data.

18. The system of claim 15, wherein the logic is further configured to determine that the input data corresponds to a length that is a non-power of two and perform a convolution via a Fast Fourier transform, wherein the logic is further configured to run the fast Fourier transform on two sequences computed from the input data by computing a dot product of the transformed data, run an inverse fast Fourier transform on the result of the dot product computation, multiply a result of the inverse fast Fourier transform with a conjugate of a second sequence of the complex sequence, and output a result corresponding to the conjugate.

19. The system of claim 15, wherein a total number of elements in the fast Fourier transform is less than or equal to a number of elements in a largest allocatable texture on the programmable graphics processing unit and wherein the largest allocatable texture is swizzled in memory coupled to the GPU.

20. The system of claim 15, wherein the logic is further configured to perform at least one computation on a CPU where double precision is implemented.

* * * * *